United States Patent

Brisard

[11] Patent Number: 5,860,736
[45] Date of Patent: Jan. 19, 1999

[54] BEATER SUPPORT WITH DRIVE WHEEL AND GUIDE

[75] Inventor: Pierre Brisard, Condé sur Vire, France

[73] Assignee: Moulinex S.A., Paris, France

[21] Appl. No.: 904,612

[22] Filed: Aug. 1, 1997

[30] Foreign Application Priority Data

Aug. 1, 1996 [FR] France ................................... 96 09755

[51] Int. Cl.$^6$ ................................. A47J 43/08; B01F 9/10
[52] U.S. Cl. ........................... 366/94; 366/197; 366/222; 366/224
[58] Field of Search ...................... 366/92–95, 197–201, 366/222–224, 220, 344

[56] References Cited

U.S. PATENT DOCUMENTS

| | | | |
|---|---|---|---|
| 267,368 | 11/1882 | Preston | 366/222 |
| 1,366,646 | 1/1921 | Glaze | 366/222 |
| 1,898,986 | 2/1933 | Fitzgerald | 366/222 |
| 2,237,859 | 4/1941 | Bille | 366/95 |
| 5,524,530 | 6/1996 | Nijzingh et al. | 366/224 X |

FOREIGN PATENT DOCUMENTS

| | | | |
|---|---|---|---|
| 384054 | 3/1908 | France | 366/95 |
| 454281 | 6/1913 | France | 366/95 |
| 2600399 | 7/1976 | Germany | 366/224 |
| 398923 | 3/1966 | Switzerland | 366/95 |
| 842290 | 7/1960 | United Kingdom | 366/95 |
| 2014865 | 9/1979 | United Kingdom | 366/224 |

*Primary Examiner*—Charles E. Cooley
*Attorney, Agent, or Firm*—Young & Thompson

[57] ABSTRACT

A support for an electric kitchen beater comprises a plate (26) that supports the beater and a drive device (28) for a bowl (18). A drive transmission (30) is disposed in the plate and has a movement outlet connection (34) comprising a drive wheel (36) with a vertical axle (37) that is adapted to come into engagement with the edge (38) of the bowl (18). The plate (26) also carries, facing the drive wheel (36) a guide (39) adapted to maintain the edge (38) of the bowl against the drive wheel (36). The drive wheel (36) has an active friction surface (36'), and the guide comprises at least one friction roller (40) mounted rotatably about an axle (41) substantially parallel to the axle (37) of the drive wheel.

9 Claims, 3 Drawing Sheets

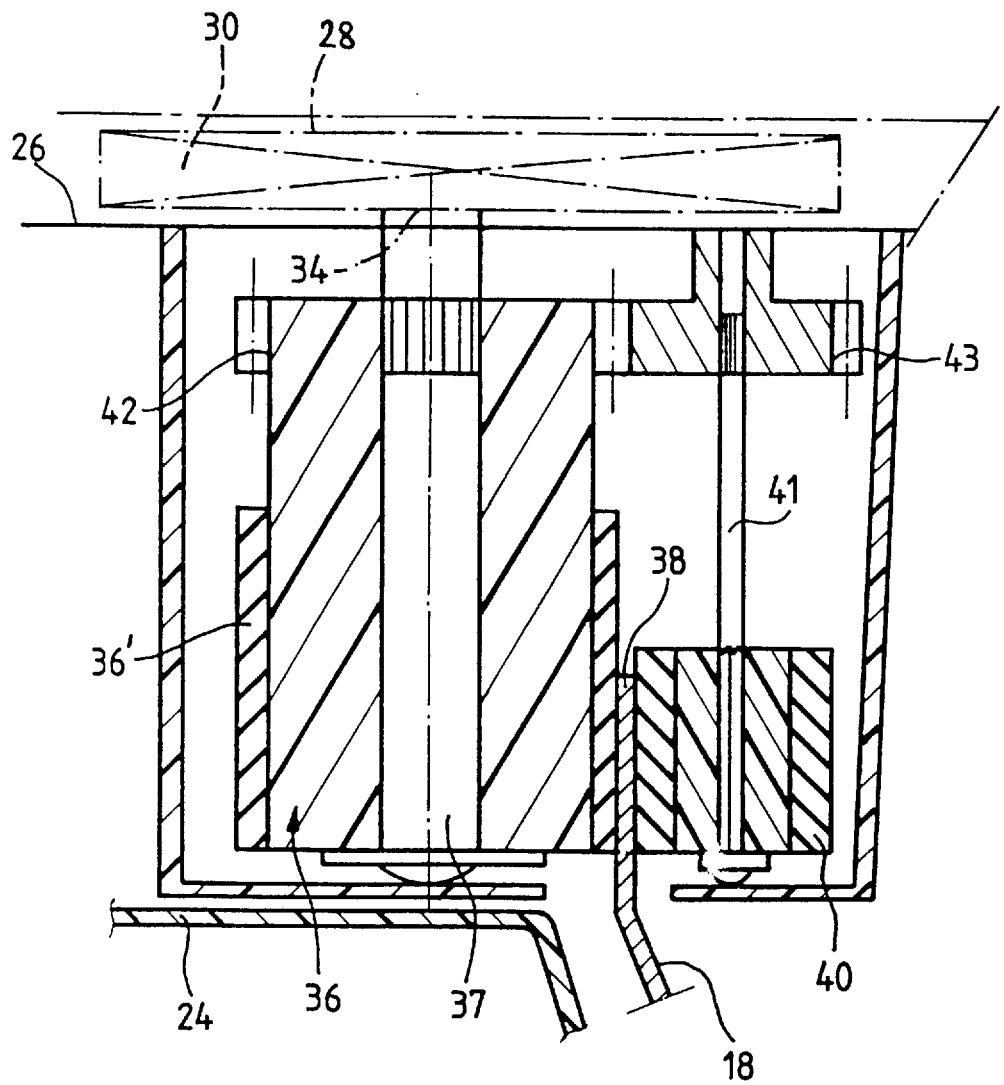
FIG_2

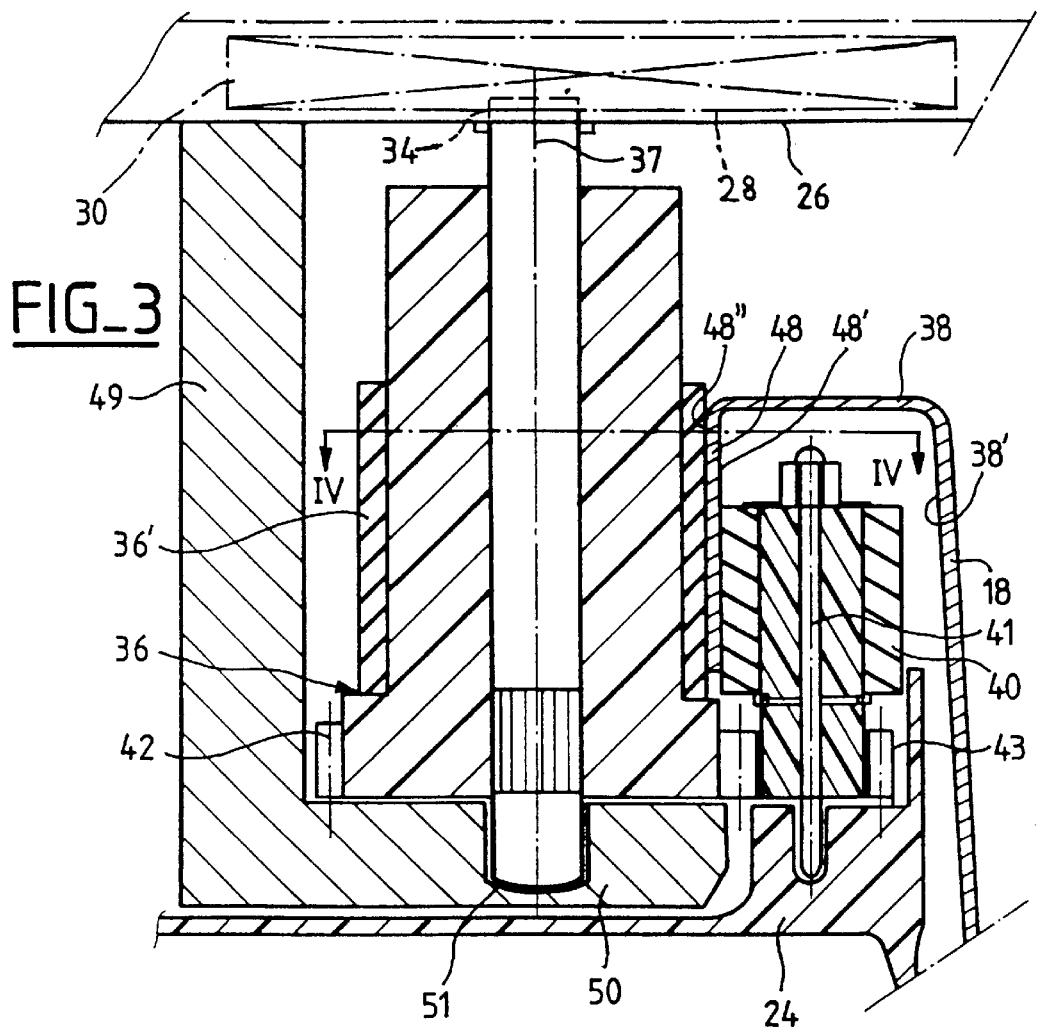
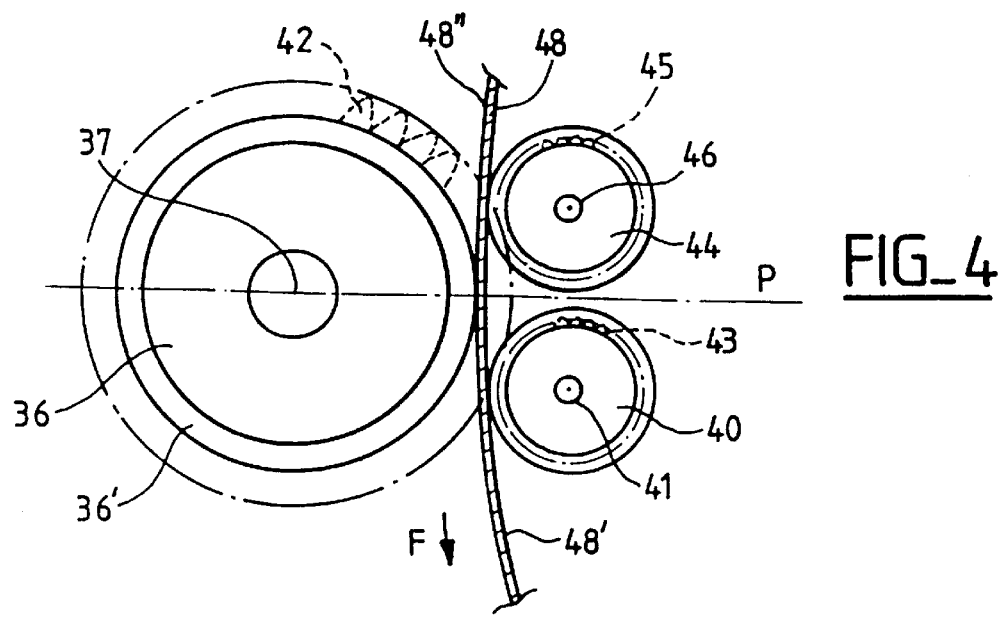

BEATER SUPPORT WITH DRIVE WHEEL AND GUIDE

BACKGROUND OF THE INVENTION

The invention relates to a support for the beater of an electric kitchen appliance comprising a base for receiving a circular bowl with a vertical axis mounted rotatably about its axis on said base, and a column rising from this base and bearing a plate for reception of the beater.

It relates more particularly to a support comprising a drive device for the bowl comprising a transmission housing arranged in the plate and having a movement input connection adapted to be driven in rotation by a rotatable member connected to the beater and an outlet movement connection comprising a drive wheel with a vertical axis projecting below the plate and adapted to come into contact with the edge of the bowl, said plate also carrying, facing the drive wheel, guide means adapted to maintain the edge of the bowl against the drive wheel.

DESCRIPTION OF THE RELATED ART

In known supports of this type, the drive wheel is constituted by a toothed pinion and comes into engagement with teeth carried by the edge of the bowl. Such a drive device is described in French patent No. 2 417 965 filed Feb. 28, 1978. Although this device has demonstrated its effectiveness both for light preparations worked by whisks as well as for heavy pastries worked with dough kneading tools, it has a cumbersome construction because the edge of the bowl must have peripheral teeth. According to the material used for production of the bowl, glass, steel or plastic, the cost can rise considerably but always remains a handicap for large-scale manufacture and sale. On the other hand, as will be understood, such a bowl is difficult to clean, and when the bottom between two teeth of the tooth series is blocked by dirt, it interferes with the connection between the drive wheel and the teeth giving rise to disengagement which is troublesome to good operation and generates noise.

To attempt to overcome these drawbacks, it has been proposed to replace the toothed drive wheel by a friction wheel and to replace the peripheral teeth on the edge of the bowl by a profiled attack edge adapted to coact with the friction wheel. Unfortunately, this simple change of construction of the drive device requires still providing the edge of the bowl with a predetermined profile and does not prevent in certain cases slippage of the friction wheel, particularly when the edge of the bowl is rendered slick or oily by the deposit of a lubricating film from the preparation worked on in the bowl.

SUMMARY OF THE INVENTION

The present invention thus has for its object to overcome the drawbacks mentioned above and to provide convenient use in the kitchen.

According to the invention, the drive wheel comprises an active frictional surface, and the guide means comprises at least one friction roller mounted rotatably about an axis substantially parallel to the axis of the drive wheel.

Thanks to this particular arrangement permitting obtaining pinching the edge of the bowl, there is ensured a positive drive of the bowl no matter what the condition of the surface of this edge.

Moreover, the bowl has a conventional shape requiring no adaptation of the edge to the drive device.

BRIEF DESCRIPTION OF THE DRAWINGS

The characteristics and advantages of the invention will become further apparent from the description which follows, by way of non-limiting example, with reference to the accompanying drawings, in which:

FIG. 2 shows an enlarged cross-sectional view of a detail of a first embodiment of the drive device according to the invention;

FIG. 3 is a view similar to that of FIG. 2 but showing a second embodiment of the drive device according to the invention;

FIG. 4 shows a schematic view of the detail of the drive device along for example the line IV—IV of FIG. 3.

DESCRIPTION OF THE PREFERRED EMBODIMENTS

Figure 1:
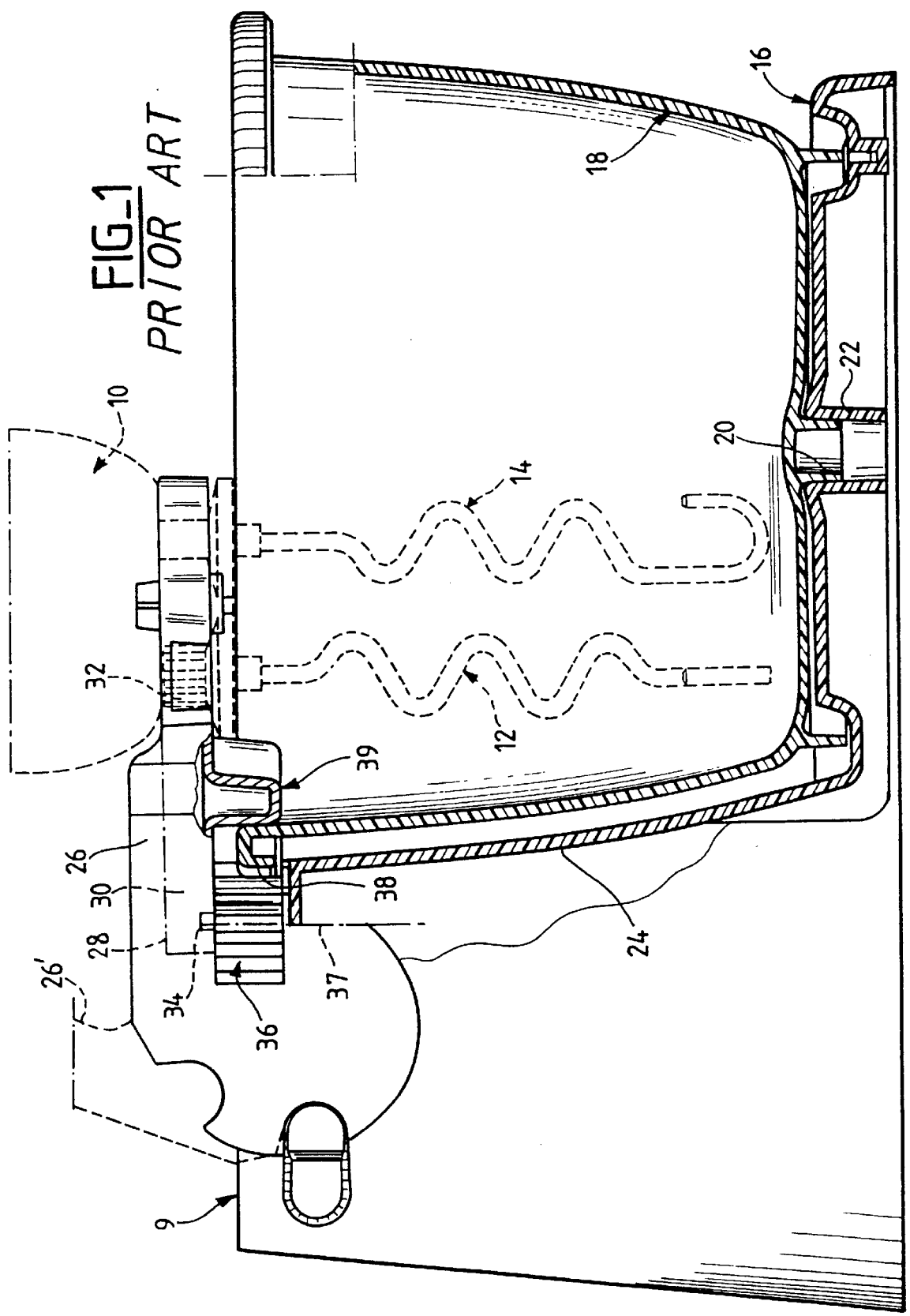
FIG. 1 shows a prior art support in which the drive device comprises a guide means and a toothed drive wheel in engagement with teeth on the bowl.

As shown in FIG. 1, representing the prior art, the support 9 is adapted to receive an electric kitchen beater 10, shown in broken lines, provided with two rotating tools 12 and 14 with parallel axes which can be either kneaders or whisks. This support comprises a base 16 for reception of a circular bowl 18 having a vertical axis, mounted rotatably about its axle 20 on a bearing 22 carried by said base, a column 24 rising from this base and carrying a plate 26 for reception of the beater 10. In this non-limiting example, the plate 26 is mounted pivotally on the column 24 and can occupy either an upwardly swung position shown in broken lines at 26', or a locked position as illustrated.

The support 9 comprises a drive device 28 for the bowl 18 and comprises in a manner known per se a transmission housing 30 arranged in the plate 26 and having a movement input connection 32 illustrated in broken line adapted to be driven in rotation by a rotatable member secured to the beater 10, and a movement output connection 34 comprising a drive wheel 36 with a vertical axis 37 projecting below the plate and adapted to come into engagement with the edge 38 of the bowl 18. So as to permit good driving of the bowl by the drive wheel 36, the plate 26 carries facing the drive wheel a guide means 39 adapted to maintain the edge 38 of the bowl against said drive wheel. In this drive device of the prior art, the drive wheel 36 and the edge 38 of the bowl constitute together a gearing system with a toothed pinion and teeth carried by the edge of the bowl, whilst the guide means 39 is constituted by a fixed boss with a smooth surface.

For ease of reading, there have been kept for the invention the same reference numerals to designate similar elements.

Thus, with respect to FIGS. 2 to 4 and according to the invention, the drive wheel 36, projecting below the plate 26, comprises an active friction surface 36', and the guide means comprises a friction roller means 40 mounted rotatably about an axle 41 substantially parallel to the axle 37 of the drive wheel 36. As shown in FIG. 2, the bowl 18 is of metal, for example stainless steel, and has a plain edge 38 which is introduced from below between the drive wheel 36 and the friction roller 40.

So as to ensure better driving of the edge 38 of the bowl 18 gripped between the drive wheel 36 and the friction roller 40, no matter what the working conditions of the whisks in the bowl, the friction roller 40 is mechanically connected rotatably to the drive wheel to constitute a counter-rotating assembly. This mechanical connection is obtained for example by a simple construction comprising a large toothed pinion 42 secured in rotation to the axle of the drive wheel 36 and a smaller toothed pinion 43 secured in rotation to the axle of the friction roller 40 and directly engaging the large pinion 42.

Moreover, tests carried out with heavy pastry preparations such as pastries or bread have led the manufacturer to choose to select for the material constituting the active friction surface 36' of the drive wheel and at least one pressure roller, a silicone rubber. Preferably, to counter the large braking couple exerted by the pastry material driven in rotation by the kneading tools 12 and 14, the invention provides that the guide means comprises a second friction roller 44 (see FIG. 4) also mechanically connected in rotation to the drive wheel 36. This mechanical connection is of the same type as that of the friction roller 40 and comprises another small pinion 45 secured to the axle 46 of the roller 44. The gearing is chosen so as to obtain a reduction ratio between the pinion 42 and the drive wheel 36 and the small pinions 43, 45 of the friction rollers 40, 44 of the order of ⅓.

According to a preferred arrangement, the two friction rollers 40 and 44 have axes parallel to each other disposed respectively symmetrically relative to a plane P radial to the drive wheel 36 and orthogonal to the edge 38 of the bowl 18 interposed between them and the drive wheel 36. In this embodiment with two rollers, one roller 44 of the two rollers can be of a hard material such as DELRIN, i.e.,acetal polymers, so as to ensure better combination of the functions of guidance, drive and pressure.

To do this, the roller 44 of hard material is disposed upstream of the roller 40 in the direction of movement (arrow F) of the edge 38 of the bowl 18.

According to another preferred embodiment of the invention shown in FIG. 3, the edge 38 of the bowl 18 has a down-turned flange 48 and the plate 26 comprises a bracket 49 whose free end 50 constitutes a bearing 51 for the drive wheel 36, whilst the roller 40 and the roller 44 are mounted on the column 24 and are disposed between the flange 48 and the edge 38 of the bowl 18, more particularly the external surface 38' of the bowl 18.

This mounting separation between the drive wheel 36 and the rollers 40, 42 permits, in the case particularly of the plate 26 being pivotally mounted on the column 24, a convenient emplacement of the bowl 18 on the base 16 and thus a good gripping of the edge 48 by the rollers 40 and 44.

Thus, simple swinging of the plate 26 toward its position 26' leaves a sufficiently large space between the drive wheel 36 and the rollers 40, 44 to introduce the edge 48 of the bowl 18.

Moreover, thanks to this embodiment, the friction rollers 40 and 44 are arranged outside the working space of the bowl and hence are sheltered from the prepared ingredients, such that the two friction rollers operate on the smooth and clean internal surface 48' of the down-turned flange 48. The same is of course true for the active friction surface of the drive wheel 36 which is applied against the external surface 48" of the flange 48. As in the preceding embodiment, the roller 44 located upstream relative to the direction of movement of the edge of the bowl is of DELRIN, i.e.,acetal polymers, whilst the roller 40 is of silicone rubber.

The operation of the drive device will now be explained with respect particularly to FIGS. 3 and 4 and considering the bowl 18 to be correctly emplaced. After actuation of the beater, the drive wheel 36 is driven in rotation in the direction of arrow F (FIG. 4) and the active friction surface 36' comes into engagement with the external surface 48" of the flange 48 of the bowl 18. Simultaneously, the large pinion 42 engages with the two small pinions 43 and 45, thereby driving respectively the friction rollers 40 and 44 in engagement with the internal surface 48' of the down-turned flange 48 by exerting a drive force greater than the braking couple created by the material worked on in the bowl. The upstream DELRIN, i.e., acetal polymers, roller 44 bears without deformation of its active surface the forces opposing the rotation of the bowl 18 about its axle 20.

Thanks to this particular embodiment of the drive device, there can be used a bowl of simple construction easy to clean whilst guaranteeing optimum drive of the working bowl.

What is claimed is:

1. In a support for an electric kitchen beater (10) comprising a base (16) for reception of a circular bowl (18) with a vertical axis mounted for rotation about an axle (20) on said base, a column (24) rising from the base and carrying a plate (26) for reception of the beater (10), and a drive device (28) for the bowl (18) comprising a transmission (30) arranged in the plate (26) and having a movement input connection (32) adapted to be driven in rotation by a rotating member connected to the beater and a movement output connection (34) comprising a drive wheel (36) with a vertical axle (37) projecting below the plate and adapted to come into engagement with an edge (38) of the bowl (18), said plate (26) also carrying, facing the drive wheel (36), guide means (39) adapted to maintain the edge (38) of the bowl (18) against the drive wheel (36); the improvement in which the drive wheel (36) has a friction surface (36') and the guide means (39) comprises a first friction roller (40) mounted rotatably about an axle (41) substantially parallel to the vertical axle (37) of the drive wheel.

2. A support as claimed in claim 1, wherein the first friction roller (40) is mechanically connected in rotation to the drive wheel (36) to constitute a counter-rotating assembly.

3. A support as claimed in claim 1, wherein the edge (38) of the bowl (18) has a down-turned flange (48), the plate (26) comprises a bracket (49) having a free end (50) constituted by a bearing (51) for the drive wheel (36), whilst the first friction roller (40) is mounted on the column (24) and is disposed between the flange (48) and the external surface (38') of the bowl (18).

4. A support as claimed in claim 1, wherein the guide means (39) comprises a second friction roller (44), said second friction roller being mechanically connected in rotation to the drive wheel (36).

5. A support as claimed in claim 4, wherein the first and second friction rollers (40, 44) have axles (41, 46) parallel to each other and arranged respectively symmetrically relative to a plane (P) extending radially from the drive wheel (36) and orthogonal to the edge (38) of the bowl (18).

6. A support as claimed in claim 4, wherein one (44) of the first and second friction rollers (40, 44) is of a hard material.

7. A support as claimed in claim 1, wherein the drive wheel (36) comprises a large toothed wheel (42) secured to the axle (37) of said drive wheel (36), said large toothed wheel (42) being in direct engagement with a smaller toothed pinion (43) secured to the axle (41) of the first friction roller (40).

8. A support as claimed in claim 7, wherein the gear ratio between the large toothed wheel (42) of the drive wheel (36) and the smaller toothed pinion (43) of the first friction roller (40) is about ⅓.

9. A support as claimed in claim 1, wherein the friction surface (36') of the drive wheel (36) is constituted by silicone rubber.

* * * * *